(12) United States Patent
Wang et al.

(10) Patent No.: US 8,345,975 B2
(45) Date of Patent: Jan. 1, 2013

(54) AUTOMATIC EXPOSURE ESTIMATION FOR HDR IMAGES BASED ON IMAGE STATISTICS

(75) Inventors: Zhe Wang, Plainsboro, NJ (US); Jiefu Zhai, Princeton, NJ (US); Joan Llach, Princeton, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 287 days.

(21) Appl. No.: 12/803,371

(22) Filed: Jun. 25, 2010

(65) Prior Publication Data
US 2010/0329557 A1 Dec. 30, 2010

Related U.S. Application Data

(60) Provisional application No. 61/269,759, filed on Jun. 29, 2009.

(51) Int. Cl.
*G06K 9/34* (2006.01)
(52) U.S. Cl. ....................................... 382/173
(58) Field of Classification Search .......... 382/173, 382/168–171, 164, 224–225, 274; 348/79–80, 348/362–364, 229.1
See application file for complete search history.

(56) References Cited

U.S. PATENT DOCUMENTS

| | | | |
|---|---|---|---|
| 5,805,721 A | 9/1998 | Vuylsteke et al. | |
| 6,359,617 B1 | 3/2002 | Xiong | |
| 6,593,970 B1 | 7/2003 | Serizawa et al. | |
| 6,839,462 B1 * | 1/2005 | Kitney et al. | 382/173 |
| 7,010,174 B2 | 3/2006 | Kang et al. | |
| 7,471,826 B1 * | 12/2008 | Navon et al. | 382/171 |
| 7,636,496 B2 * | 12/2009 | Duan et al. | 382/274 |
| 7,821,570 B2 * | 10/2010 | Gallagher et al. | 348/364 |
| 8,081,208 B2 * | 12/2011 | Inomata et al. | 348/80 |
| 2005/0117799 A1 * | 6/2005 | Fuh et al. | 382/169 |
| 2006/0262363 A1 | 11/2006 | Henley | |

FOREIGN PATENT DOCUMENTS
EP 1758058 2/2007

OTHER PUBLICATIONS

Krawczyk et al., "Lightness Perception in Tone Reproduction for High Dynamic Range Images", Eurographics 2005, vol. 24, No. 3, 2005.
Agarwala et al., "Interactive Digital Photomontage," The ACM SIGGRAPH 2004 Conference Proceedings, 9 pages.
Burt et al., "Enhanced Image Capture Through Fusion," IEEE 1993, David Sarnoff Research Center, Princeton, NJ, pp. 173-182.
Burt et al., "The Laplacian Pyramid as a Compact Image Code." IEEE Transactions on Communications, vol. COM-31, No. 4, Apr. 1983, pp. 532-540.

(Continued)

*Primary Examiner* — Ishrat I Sherali
(74) *Attorney, Agent, or Firm* — Robert D. Shedd; Harvey D. Fried; Richard LaPeruta

(57) ABSTRACT

A method of segmenting regions of an image wherein a number of partitions are determined based on a range of an image histogram in a logarithmic luminance domain. Regions are defined by the partitions. A mean value of each region is calculated by K-means clustering wherein the clustering is initialized, data is assigned and centroids are updated. Anchor points are determined based on the centroids and a weight of each pixel is computed based on the anchor points.

15 Claims, 1 Drawing Sheet

OTHER PUBLICATIONS

Chiu et al., "Spatially Nonuniform Scaling Functions for High Contrast Images," Proceedings from Graphics Interface '93, pp. 245-253, Toronto, May 1993.
Reinhard et al., "Dynamic Range Reduction Inspired by Photoreceptor Physiology," IEEE Transactions on Visualization and Computer Graphics, vol. 11, No. 1, Jan./Feb. 2005.
Dippel et al., Multiscale Contrast Enhancement for Radiographies: Laplacian Pyramid Versus Fast Wavelet Transform, IEEE Transactions on Medical Imaging, vol. 21, No. 4, Apr. 2002.
Drago et al., "Adaptive Logarithmic Mapping for Displaying High Contrast Scenes," Computer Graphics Forum, vol. 22(3), 9 pages, The Eurographics Assoc. and Blackwell Publishers 2003.
Durand et al., "Fast Bilateral Filtering for the Display of High-Dynamic-Range Images," ACM Transactions on Graphics. 21(3): 257-266. 2002.
Fairchild et al., "The iCAM Framework for Image Appearance, Image Differences, and Image Quality," Journal of Electronic Imaging, 13: 126-138, 2004, 34 pages.
Fattal et al., "Gradient Domain High Dynamic Range Compression," ACM Transactions on Graphics, 21(3): pp. 249-256, 2002.
Krawczyk et al., "Computational Model of Lightness Perception in High Dynamic Range Imaging," Proc. of SPIE-IS&T Electronic Imaging, SPIE vol. 6057, 605708, 12 pages, 2006.
Lichinski et al., "Interactive Local Adjustment of Tonal Values", Association for Computing Machinery, Inc., 2006.
Mertens et al., "Exposure Fusion," Pacific Graphics 2007, 9 pages.
Reinhard et al., "Dynamic Range Reduction Inspired by Photoreceptor Physiology," IEEE Transactions on Visualization and Computer Graphics, vol. 11, No. 1, Jan./Feb. 2005, pp. 13-24.
Reinhard et al., "Photographic Tone Reduction for Digital Images", Asasociation for Computing Machinery, Inc. 2002.
Seetzen et al., "High Dynamic Range Display Systems," ACM SIGGRAPH Conference Proceedings, ACM Press, Aug. 9, 2004, pp. 1-9.
Toet, "Adaptive Multi-Scale Contrast Enhancement Through Non-Linear Pyramid Recombination", Pattern Recognition Letters, No. 11, Amsterdam, NL, pp. 735-742.
Vuylsteke et al., Multiscale Image Constrast Amplification (MUSICATM), SPIV, vol. 2167, Image Processing, 1994.
Wikipedia, "Pyramid (Image processing)," http://en.wikipedia.org/wiki/Pyramid... (Image_processing), 2 pages.
Yee et al., "Segmentation and Adaptive Assimilation for Detail-Preserving Display of High-Dynamic Range Images." The Visual Computer, published online Jul. 8, 2003, copyright Springer-Verlag 2003, pp. 457-466.

* cited by examiner

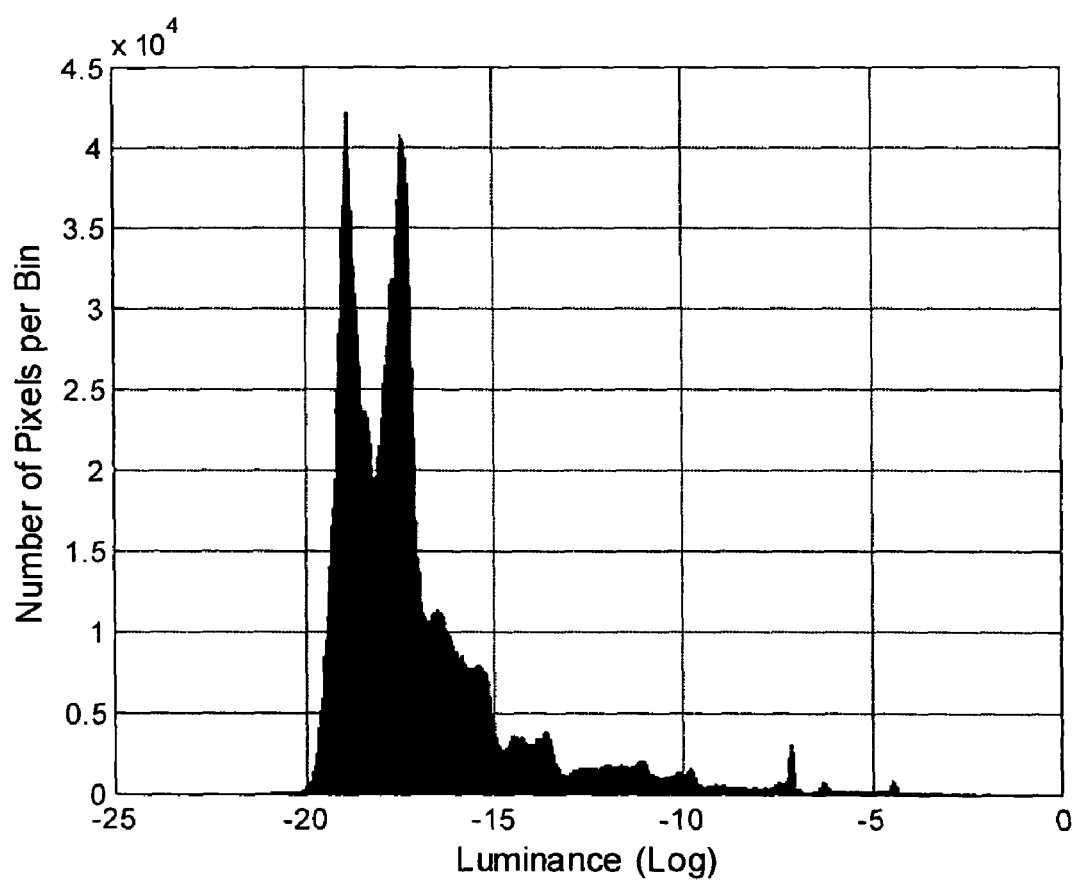

AUTOMATIC EXPOSURE ESTIMATION FOR HDR IMAGES BASED ON IMAGE STATISTICS

CROSS REFERENCE TO RELATED APPLICATIONS

This application claims the benefit of U.S. Provisional Application Ser. No. 61/269,759 filed Jun. 29, 2009, which is incorporated by reference herein in its entirety.

FIELD OF THE INVENTION

The invention relates to the tone reproduction of high dynamic range (HDR) content on low dynamic range (LDR) displays, which is also known as the tone mapping. In particular, this invention is related to methods of region segmentation in tone mapping.

BACKGROUND OF THE INVENTION

In most applications, the tone mapping process must usually meet two requirements: keep image details, e.g. local contrast and maintain the appearance of relative brightness. Known work on tone mapping focuses on the first requirement and simply neglects the second one, which is usually the most important from the artists' perspective.

High dynamic range (HDR) has received much attention in recent years as an alternative format for digital imaging. The traditional Low Dynamic Range (LDR) image format was designed for displays compliant with ITU-R Recommendation BT 709 (a.k.a. Rec. 709), where only two orders of magnitude of dynamic range can be achieved. Real world scenes, however, have a much higher dynamic range, around ten orders of magnitude in daytime, and the human visual system (HVS) is capable of perceiving 5 orders of magnitude at the same time. Tone mapping algorithms attempt to compress a large range of pixel values into a smaller range that is suitable for display on devices with limited dynamic range. Accurate region segmentation in High Dynamic Range (HDR) images is a crucial component for HDR tone mapping.

Currently, most display devices have a limited dynamic range, lower than one can encounter in real world scenes. HDR scenes shown on Low Dynamic Range (LDR) display devices usually turn out to be either saturated (corresponding to the concept of "overexposure" in photography) or extremely dark (corresponding to "underexposure"). Either case is undesired as numerous details can be lost.

SUMMARY OF THE INVENTION

In view of these issues, the invention provides a method of segmenting regions of an image wherein a number of partitions are determined based on a range of an image histogram in a logarithmic luminance domain. Regions are defined by the partitions. A mean value of each region is calculated by K-means clustering wherein the clustering is initialized, data is assigned and centroids are updated. Anchor points are determined based on the centroids and a weight of each pixel is computed based on the anchor points.

BRIEF DESCRIPTION OF THE DRAWINGS

The invention will now be described by way of example with reference to the accompanying FIGURE wherein:

FIG. 1 shows a histogram.

DETAILED DESCRIPTION OF THE EMBODIMENTS

The invention will now be described in more detail wherein a method adjusts the exposure of each region based on the overall brightness level of the original HDR image.

In order to display an HDR image on a LDR display device, a tone mapping method must be employed to map the HDR image, which is usually available as radiance, to 8 bit RGB index numbers. The tone mapping process is not straight forward because it has to simulate the process that happens in the HVS so that the tone mapped LDR image can deceive the HVS into believing it is close enough to the original HDR image. This requires the tone mapping algorithm to be able to maintain both the local contrast and the perceptual brightness.

The method according to the invention includes a zone-based tone mapping framework which divides the image into regions and then estimates the exposure of each region. The estimation of the exposure, however, maximizes the use of the dynamic range on the tone mapped image, without special consideration to the overall look (brightness) of the tone mapped image compared to the original HDR image.

The idea behind the method is to obtain the most appropriate exposure for each region with similar illumination. It in fact resonates the concept from photography called zone system and the manual tone mapping methods invented by photographers like Ansel Adams (Adams, A. "The Negative", The Ansel Adams Photography series. Little, Brown and Company. 1981). The disclosed framework has shown advantages in HDR tone mapping.

Region segmentation is a crucial component throughout the whole method. It seeks to divide the HDR image into different regions where pixels in each of them share the same illumination. One can consider each region has its own "best exposure" value. To accurately segment regions, the correct exposure value is obtained for each region.

Two region segmentation methods are presented below on the basis of K-means clustering and differential equations, respectively.

In summary, region segmentation plays a critical role in the tone mapping process. It is usually a rather challenging problem to decide the number of regions and how to segment the HDR image into regions automatically.

The traditional region segmentation is a very subjective task and it is conducted manually. Well-trained photographers decide how to segment the image into different regions and which zone each region of a photo belongs to with their multiple-years experience and complicated procedure such as using a light meter to record the light condition for each key element in the scene during shooting [Adams, A. "The Print", The Ansel Adams Photography series. Little, Brown and Company. 1981].

A simple region segmentation method has advantages such as being simple to implement and producing good results for some test images. This method, however, has several drawbacks, such as arbitrarily chosen region position.

In the framework proposed by Krawczyk [Grzegorz Krawczyk, Karol Myszkowski, Hans-Peter Seidel, "Computational Model of Lightness Perception in High Dynamic Range Imaging", In Proc. of IS&T/SPIE's Human Vision and Electronic Imaging, 2006], given the centroids obtained from K-means clustering, only those with very large number of pixels belonging to them are considered. It is, however, not always desirable in HDR region segmentation since it neglects regions with relatively small number of pixels yet important details, which is usually the case when the dynamic range is very high.

For segmentation on HDR images, one region can be associated with an approximate luminance range in a scene (i.e. a segment in the histogram of an HDR image, FIG. 1). Hence, in HDR tone reproduction, incorrect region position leads to undesired exposure value for each LDR image. Furthermore, an inappropriate number of regions will either bring up computational complexity when the number is unnecessarily large or result in a region distribution incapable of covering the whole histogram of the HDR image when the number is too small.

The HDR image segmentation can be a hard or a fuzzy one. In either case, each region is represented by a matrix of the same size as the original HDR image. Each element of the matrix is the probability (weight) of the pixel belonging to this region. If a hard segmentation is applied, one pixel belongs to a single region and thus the weight is either 0 or 1. For the case of fuzzy segmentation, each pixel can spread over several (even all) regions, and consequently the probability can take any value between 0 and 1.

Anchor point is defined as follows: any pixel in an HDR image is saturated and mapped to one if the luminance of that pixel exceeds the anchor point; otherwise it will be mapped to a value between 0 and 1. Once the anchor point of each region is known, a weight of each pixel for each region can be computed. In general, for each region (defined by the corresponding anchor point $A_i$) in a single exposure image, the closer the pixel intensity is to 0.5 (which corresponds to mid-grey), the larger the weight of that pixel for that region.

A histogram of an HDR image can span over 10 stops (in photography, stops are a unit used to quantify ratios of light or exposure, with one stop meaning a factor of two), as shown in FIG. 1, while one LDR image can have contrast ratio ranging from 4 to 8 stops. The segmentation methods seek to utilize the information from the image histogram.

1. Region Segmentation Methods 1.1. K-Mean Clustering Based Method

To divide the radiance range properly, the concept of clustering can be utilized, as used for exploratory data analysis. There have been numerous clustering approaches, such as hierarchical clustering, partitional clustering and spectral clustering. Among them, K-means clustering is one of the most popular and widely studied clustering methods for points in Euclidean space. In one dimension, it is a good way to quantize real valued variables into k non-uniform buckets.

The K-means formulation assumes that the clusters are defined by the distance of the points to their class centroids only. In other words, given a set of observations $(x_1, x_2 \ldots, x_n)$ where each observation $x_i$ is a d-dimensional real vector, the goal of clustering is to find those k mean vectors $c_1, \ldots, c_k$ and provide the cluster assignment $y_i$ of each point $x_i$ in the set, such that this set can be partitioned into k partitions (k<n) $S=\{S_1, S_2, \ldots, S_k\}$. The K-means algorithm is based on an interleaving approach where the cluster assignments $y_i$ are established given the centers and the centers are computed given the assignments. The optimization criterion is as follows:

$$\min_s \sum_{j=1}^{k} \sum_{x_i \in S_j} \|x_i - c_j\|^2 \qquad (1)$$

where $c_j$ is the centroid of $S_j$.

A method utilizes the K-mean clustering to get the anchor points. It can be described as following steps:

Step 1: First calculate the range of the histogram in logarithm luminance domain with base two and then decide the number of partitions k according to the following equation $$k = \left\lfloor \log_2\left(\frac{L_{max}}{L_{min}}\right) / \lambda \right\rfloor \qquad (2)$$

where $L_{max}$ and $L_{min}$ are the maximum and minimum luminance of the image, respectively. Note here since overlapping between the regions sometimes is desirable, $\lambda$ is chosen as 4 heuristically.

Step 2: To obtain the mean value of each region, K-means clustering is applied in log 2 luminance domain. The basic procedure is as follows.

The observation set $(x_1, x_2, \ldots, x_n)$ is the value of log 2 luminance of each pixel. And the centroid of each cluster is denoted as $c_1, \ldots, c_k$.

1) Initialize the Clustering.

There are numerous ways for initialization. Two classical methods are random seed and random partition. In this example k seed points are randomly selected as the initial guess for the centroids in various ways.

2) Assign the Data.

Given the estimated centroids for the current round, the new assignments are computed by the closest center to each point $x_i$. Assume that $c_1, \ldots, c_k$ are given from the previous iteration, then $$y_i = \arg\min_j \|x_i - c_j\|^2 \qquad (3)$$

3) Update the Centroids.

Given the updated assignments, the new centers are estimated by taking the mean of each cluster. For any set, one can have $$c_i = \frac{1}{|S_i|} \sum_{j \in S_i} x_j \qquad (4)$$

The procedure is conducted in an iterative fashion until the maximum number of iteration step is reached or when the assignments no longer change. Since each step is guaranteed to reduce the optimization energy the process must converge to some local optimum.

Step 3: Calculate the Anchor Points with the Mean Value Obtained Above.

Given the centroid values, a half distance between any two adjacent centroids is computed, denoted as $l_i (i=1, 2, \ldots, k)$ $$l_i = \begin{cases} \lfloor (c_{i+1} - c_i)/2 \rfloor & i = 1, 2, \ldots, k-1 \\ \lfloor (l_{max} - c_i)/2 \rfloor & i = k \end{cases} \quad (5)$$

Afterwards, the anchor points are defined as follows $$A_i = c_i + \min(l_i, \lambda) \; i=1, 2, \ldots, k \quad (6)$$

where $\lambda$ is chosen as 4 empirically.

Step 4: Once the anchor point of each region is known, the weight of each pixel is computed for each region. In general, for each region (defined by the corresponding anchor point $A_i$), the closest the value of a pixel in the single exposure image is to 0.5, the larger the weight of that pixel for that region (defined by the corresponding anchor point $A_i$).

Thus, the weight of pixel at location (i, j) for region n (defined by anchor point $A_n$) can be computed as below:

$$W_n(i, j) = C e^{-\frac{\left(S\left(\frac{L(i,j)}{A_n}\right)-0.5\right)^2}{\sigma^2}} \quad (7)$$

where C is a normalization factor and it is defined as:

$$C = \frac{1}{\sum_n e^{-\frac{\left(S\left(\frac{L(i,j)}{2A_n}\right)-0.5\right)^2}{\sigma^2}}} \quad (8)$$

The above computed weights take values in the range [0,1] and hence define a fuzzy segmentation of the luminance image into N regions. This means each region might contain all the pixels in the image, although only a portion of them might have large weights.

In another implementation, the weights are binarized (i.e. make them either 0 or 1), resulting in a hard segmentation:

$$p = \underset{n}{\text{ArgMax}}(W_n(i, j)) \quad (9)$$
$$n = 1, 2, \ldots, N$$

$$W_p(i, j) = 1 \quad (10)$$
$$W_q(i, j) = 0 \; (q \neq p)$$

Note that the anchor points $A_n$ as well as the weights $W_n$ are fixed once the segmentation is done.

1.2. Differential Equations Based Method

In the following, an alternate embodiment method to use PDEs for region segmentation will be described as follows.

Step 1: Design the Cost Function (Energy Function)

The goal is to obtain the best exposure for each region. To accomplish this, an energy function is designed as $$J = \sum_i p_{L_i} \left[ (1 - e^{N_1}) \times \frac{e^{N_1}}{e^{N_1} + e^{N_2} + \ldots + e^{N_k}} + \right. \quad (11)$$
$$(1 - e^{N_2}) \times \frac{e^{N_2}}{e^{N_1} + e^{N_2} + \ldots + e^{N_k}} +$$
$$\left. \ldots + (1 - e^{N_k}) \times \frac{e^{N_k}}{e^{N_1} + e^{N_2} + \ldots + e^{N_k}} \right]$$

$$e^{N_j} = e^{-\frac{\left[S\left(\frac{L_i}{A_j}\right)-0.5\right]^2}{\sigma^2}} \; (j = 1, 2, \ldots, k) \quad (12)$$

where i is the index of bins in the histogram, $L_i$ is the corresponding luminance value, $P_L$ is the probability of $L_i$, $\{A_j\}$ are the anchor points sought, $\sigma$ is a constant, which equals to 0.2 in the disclosed implementation, and $S(\cdot)$ is the saturation function, which is defined as follows:

$$S(x) = \begin{cases} 1 & x > 1 \\ x^{1/\gamma} & \text{otherwise} \end{cases} \quad (13)$$

where $\gamma$ optimally takes values in the range [2.2, 2.4].

In Eq. (12), Gaussian curve $e^{(\cdot)}$ serves as a measurement for exposure. The closer the luminance is to 0.5, the better the exposure is.

Step 2: Solve the Optimization Problem

Using a chain rule, differentiation of energy function J with respect to anchor point set $$A = \begin{bmatrix} A_1 \\ A_2 \\ \vdots \\ A_k \end{bmatrix}$$

can be obtained, noted as $$\frac{dJ}{dA}.$$

In order to minimize the energy function, can a gradient descent method can be utilized, i.e., $$A_{n+1} = A_n - \gamma \cdot \nabla J(A_A) \quad (14)$$

where $$A_n = \begin{bmatrix} A_{n,1} \\ A_{n,2} \\ \vdots \\ A_{n,k} \end{bmatrix}$$

and $\gamma$ is the step-size parameter. Eq. (14) is iterated until the maximum number of iteration step is reached or the prescribed accuracy is met, i.e., $\|A_{n+1}-A_n\| \leq \epsilon$, where $\epsilon$ is a given small positive value.

$$\frac{dJ}{dA}$$

is used in an iterative procedure, which at each step seeks to decrease the error. Upon convergence, the anchor points are local optimum of the energy function.

Step 3: Once the anchor point of each region is known, compute the weight of each pixel for each region as described above.

The foregoing illustrates some of the possibilities for practicing the invention. Many other embodiments are possible within the scope and spirit of the invention. For example, alternatively in Section 1.2 step 2, there other methods than gradient descent can be used to solve the optimization problem. It is, therefore, intended that the foregoing description be regarded as illustrative rather than limiting, and that the scope of the invention is given by the appended claims together with their full range of equivalents.

What is claimed is:

1. A method of segmenting regions of an image comprising the steps of:
    determining a number of partitions based on a range of a histogram of the image;
    defining regions by the partitions;
    estimating a centroid of each region;
    assigning pixel data to the estimated centroids by assigning each pixel data point to its nearest centroid to form a plurality of clusters;
    estimating new centroids by taking the mean of each cluster; and,
    determining anchor points based on the new centroids.

2. The method of claim 1 wherein the centroid is determined by K-means clustering applied in a logarithmic luminance domain.

3. The method of claim 2 wherein anchor points are based on a half distance between adjacent centroids.

4. The method of claim 3 further comprising the step of computing a weight of each pixel within each region.

5. The method of claim 4 further comprising tone mapping the image based on the pixel weighting.

6. A method of segmenting regions of an image comprising the steps of:
    determining a number of partitions based on a range of an image histogram in a logarithmic luminance domain;
    defining regions by the partitions;
    calculating a mean value of each region by K-means clustering wherein the clustering is initialized, data is assigned and centroids are updated;
    determining anchor points based on the centroids; and,
    computing a weight of each pixel based on the anchor points.

7. The method of claim 6 wherein the cluster is initialized by one of a random seed method or a random partition method.

8. The method of claim 7 wherein the centroids are updated by an iterative process.

9. The method of claim 6 wherein regions are permitted to overlap.

10. The method of claim 6 further comprising the step of normalizing the weights.

11. The method of claim 6 further comprising the step of binarizing the weights.

12. A method of segmenting regions of an image comprising the steps of:
    designing an energy function based upon a probability of anchor points in an image histogram;
    iteratively differentiating the energy function using a chain rule to determine the anchor points; and,
    computing a weight of each pixel in the image based on the anchor points.

13. The method of claim 12 wherein the energy function is expressed as:

$$J = \sum_i p_{L_i} \left[ (1-e^{N_1}) \times \frac{e^{N_1}}{e^{N_1}+e^{N_2}+\ldots+e^{N_k}} + \right.$$
$$(1-e^{N_2}) \times \frac{e^{N_2}}{e^{N_1}+e^{N_2}+\ldots+e^{N_k}} +$$
$$\left. \ldots +(1-e^{N_k}) \times \frac{e^{N_k}}{e^{N_1}+e^{N_2}+\ldots+e^{N_k}} \right]$$

where $$e^{N_j} = e^{-\frac{\left[S\left(\frac{L_i}{A_j}\right)-0.5\right]^2}{\sigma^2}}$$

(j=1, 2, ..., k) and
    where i is an index of bins in the histogram, $L_i$ is a corresponding luminance value, $P_L$ is a probability of $L_i$, $\{A_j\}$ are the anchor points, $\sigma$ is a constant, and $S(\cdot)$ is a saturation function, defined by $$S(x) = \begin{cases} 1 & x > 1 \\ x^{1/\gamma} & \text{otherwise.} \end{cases}$$

14. The method of claim 13 wherein $e^{N_j}$ is a Gaussian curve which defines a measurement for exposure.

15. The method of claim 14 further comprising a gradient descent method applied at the differentiating step.

* * * * *